Patented June 20, 1933

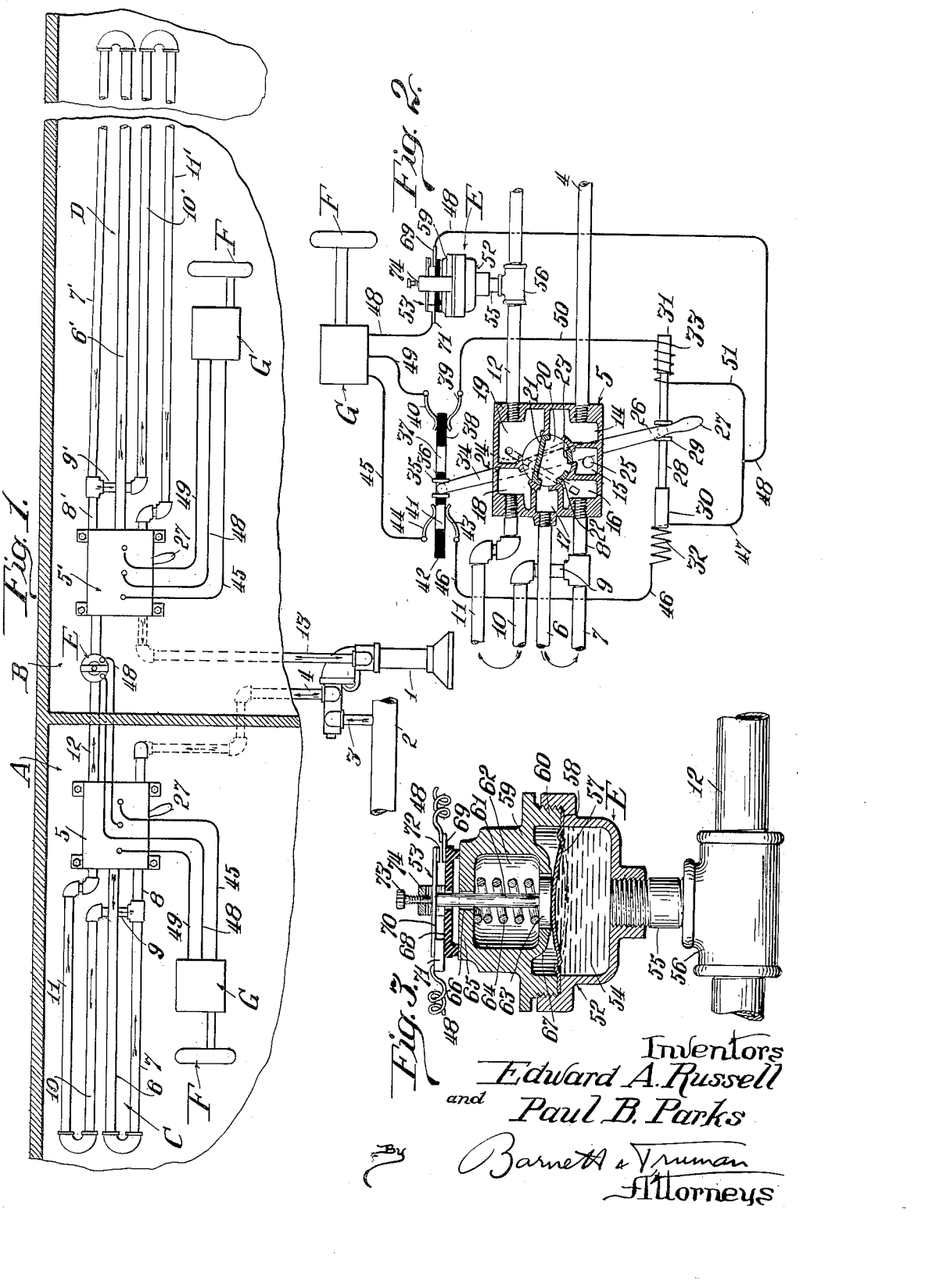

1,914,982

UNITED STATES PATENT OFFICE

EDWARD A. RUSSELL, OF CHICAGO, AND PAUL B. PARKS, OF OAK PARK, ILLINOIS, ASSIGNORS TO VAPOR CAR HEATING COMPANY, INC., OF CHICAGO, ILLINOIS, A CORPORATION OF NEW YORK

PRESSURE OPERATED CONTROL MECHANISM FOR THERMOSTATICALLY OPERATED VALVES

Application filed January 15, 1931. Serial No. 508,910.

This invention relates to certain new and useful improvements in pressure-operated control mechanism for thermostatically operated valves, and more particularly to a means for automatically interrupting the circuit of an electrical valve-operating means so as to render this means ineffective as long as the fluid pressure in the system controlled by the valve exceeds a certain predetermined maximum.

In vapor car heating systems, to which this invention is particularly applicable, a valve is provided for governing the flow of steam or vapor from the vapor regulator into and through the radiator coil or loop, and from the radiator back to the vapor regulator. Thermostatically controlled electrically operated means is provided for automatically moving the valve from the open position in which steam or vapor is supplied to the radiator to a closed position in which the radiator loop is cut off and the steam is shunted directly from the valve back to the vapor regulator. Under normal operating conditions a very low pressure exists in such a system, a vapor heating system operating under substantially atmospheric pressure. However, when such a system is first started, a very considerable back pressure may be developed in certain types of installations until all of the air has been forced out of the system. This back pressure may be sufficient to cause the rotary or movable operating parts of the valve to stick. If at this time the temperature adjacent the thermostat has risen to such a point that the electrically operated means will attempt to automatically close the valve, the sticking valve will cause the electric system to blow its fuse and thus be rendered inoperative. A particular type of installation in which this condition is apt to arise is one in which a relatively small or short radiator coil adapted to heat a correspondingly small space is connected in series with a relatively large radiator coil, the steam or vapor passing first through the small coil and thence through the large coil. A separate control valve is provided for each coil, and the smaller coil will become filled with heating medium and perhaps raise the temperature in the space heated thereby to such a point that the thermostat will attempt to shut off the control valve before the air has been forced from the longer or larger radiator unit. Since both radiators are connected in series, an abnormally high pressure will be temporarily developed throughout the entire piping system, and this back pressure may be high enough to cause the control valve for the smaller radiator coil to stick and thus blow the fuse of its operating system in case this electrically operated means attempts to close the valve.

According to the present invention a pressure controlled circuit breaker is provided in the electrical operating circuit, this circuit breaker normally being closed but being automatically opened whenever a pressure exceeding a certain predetermined maximum is developed in the piping circuit. As a result, the electric operating circuit will be incomplete and the thermostatically controlled means cannot attempt to function until the fluid pressure in the circuit has been reduced to such a point that the valve will be free to operate.

The principal object of this invention is to provide a pressure-operated control mechanism for thermostatically operated valves, of the type briefly described hereinabove and disclosed more in detail in the specifications which follow.

Another object is to provide an improved means for rendering an electrically operated valve moving mechanism inoperative as long as an excessive fluid pressure exists in the system controlled by the valve.

Another object is to provide an improved safety mechanism for vapor car heating systems adapted to postpone the functioning of the automatic valve operating mechanism until such time as the fluid pressure in the system has been reduced below a predetermined maximum.

Other objects and advantages of this invention will be more apparent from the following detailed description of one approved form of apparatus built and operating according to the principles of this invention.

In the drawing:

Fig. 1 is a partial diagrammatic view illustrating a form of car heating system and its control mechanism in which the improvements of this invention are particularly applicable.

Fig. 2 is a diagrammatic illustration of one of the control valves and a portion of the electrically operated control mechanism therefor, showing the pressure operated circuit breaker installed in this control system.

Fig. 3 is a central vertical section through the improved circuit breaker.

Referring first more particularly to Fig. 1, a fragment of a railway car is indicated including a relatively small compartment A and a relatively large compartment B, each provided with its individual and separately controlled radiating system, the two radiating systems however being connected in series and supplied with steam from the same vapor regulator indicated at 1. Steam flows from the train supply pipe 2 through branch pipe 3 to the vapor regulator 1 in which a thermostatically controlled valve governs the flow of vapor through pipe 4 to the control or distributing valve 5. The vapor flows from valve 5 to and through the radiator coil or loop indicated generally at C, which is relatively small and adapted to heat the small compartment A. More specifically, the vapor flows from valve 5 through a first heating loop consisting of outgoing pipe 6 and return pipe 7. A drain connection is provided between pipe 7 and the valve 5 through pipe 8, but the vapor flow continues through pipe 9 to a second heating loop consisting of outgoing pipe 10 and return pipe 11 through which the vapor is returned to the valve 5. The vapor then flows from valve 5 through a connecting pipe 12 to a second control valve 5' which may be in all respects the same as the first valve 5. Valve 5' governs the flow of steam through a second radiating unit indicated generally at D which may be the same in all respects as the first radiating unit C except that the pipe loops are considerably longer to provide the additional radiating surface necessary for heating the larger compartment B. The several pipes constituting the radiator D are indicated by primed reference characters similar to the unprimed characters used in the radiator C. A return pipe 13 extends from valve 5' back to the vapor regulator 1, which is of the usual type and includes an expansible temperature-responsive member adapted to actuate the valve controlling the flow of steam between pipes 3 and 4. When steam or vapor has filled both radiating units C and D and returned through pipe 13, the expansion member will operate the valve to cut off the further flow of steam from pipe 3 into supply pipe 4. When steam or vapor no longer flows through pipe 13 to the vapor regulator, the expansion member will cool and contract and the valve will open to permit further steam to flow from pipe 3 into pipe 4 and thence to the radiating system. All of this is well known in the art.

A thermostatically controlled electrically operated valve regulating mechanism is provided in each compartment A and B for controlling the respective valves 5 and 5' so as to cut off the flow of further heating medium into the respective radiating coils C or D when the temperature in the compartment heated thereby has been raised to a predetermined point. When the temperature has fallen in the compartment below this desired point the valve will again be automatically opened to admit the flow of additional heating medium to the radiator. A typical construction of one of these valves and the electrical control mechanism therefor is partially illustrated in Fig. 2. The form of valve here shown and the thermostatically controlled electrically operated system therefor are not new but have been previously disclosed in several prior patents, for example the patent to Russell 1,440,701, granted January 2, 1923. For that reason the electrical operating circuits have only been partially indicated in the present drawing, as will be hereinafter apparent. The valve 5 comprises a casing formed with a plurality of separate chambers 14, 15, 16, 17, 18 and 19, each of which has a port connection with a central cylindrical chamber in which is rotatably fitted a valve body 20. The rotatable valve member 20 comprises three vertically extending web portions 21, 22 and 23. When the valve is in the open position shown in Fig. 2, the arcuate webs 22 and 23 close the ports opening from chambers 15 and 16, and the main web portion 21 separates the supply side of the valve from the return side. When the valve is moved to the closed position shown in dotted lines the flow of steam to the radiator C will be cut off, all as hereinafter described.

When the valve is in the open position shown in Fig. 2, steam will flow in through pipe 4 to chamber 14, thence through the central movable valve member 20 to chamber 17 and through the pipe loops of radiator C, returning to chamber 18, thence through central valve member 20 to chamber 19 and flowing out through pipe 12 to the second valve 5'. Condensate from the first pipe loop 6 and 7 of the radiator C will drain through connection 8 into chamber 16 and thence through the water sealed passage 24 into chamber 19, passing out through pipe 12. When the valve is shifted to the closed position shown in dotted lines, the web 21 will be moved so as to form a connection between inlet chamber 14 and outlet chamber 19 so that the steam supply will flow directly from pipe 4 into chamber 14, through valve 20 to chamber 19 and out through pipe 12 to the second control valve 5'. Both loops of radiator C will be cut off from the steam supply, and the webs 22 and 23 will be ineffective at this time to close any of the ports so that the several chambers 15, 16, 17 and 18 are all in open communication and condensate from any of the pipe connections will flow out through drain 25 leading from chamber 15. It will thus be seen that the supply of heating medium to radiator C may be cut off without interfering with the continued flow of steam through supply pipe 4, valve 5 and pipe 12 to the second valve 5' and thence to the second radiator unit D. The valve 5' may be substantially identical in construction with the valve 5 already described so that when moved to a closed position steam or vapor will flow from connecting pipe 12 through valve 5' and pipe 13 back to the vapor regulator 1, while communication with the radiating coils of radiator D is cut off.

An operating lever 26 having a manually operable handle 27 is connected with the rotatable valve member 20. An operating rod 28 has a yoke connection at 29 with lever 26 and is formed at its opposite ends with the cores 30 and 31 of the solenoids 32 and 33 respectively. An extension 34 at the opposite end of lever 26 has a yoke connection at 35 with a central insulated portion 36 of a switch member, one arm of which comprises contact member 37 and insulated portion 38 adapted to alternatively engage between a pair of fixed spring contacts 39 and 40, and similarly the opposite arm of the switch member comprises a contact portion 41 and an insulated portion 42 adapted to slide between a pair of fixed spring contacts 43 and 44.

At F is indicated a thermostat or plurality of thermostats and G indicates diagrammatically a system of switches and relays (shown in detail in the Russell patent hereinabove referred to and in numerous other patents in this art) whereby the valve will be operated at certain temperatures when the car is in service and at certain other temperatures when the car is out of service. It is sufficient for the present purposes to explain that when a certain maximum temperature has been reached in the space heated by radiator C, the thermostats F will complete connections so that a current will flow from control mechanism G through wire 45, spring contact 44, slidable contact 41, spring contact 43, wire 46, solenoid 32, wire 47 and neutral wire 48 back to the control mechanism G. Solenoid 32 now being energized will draw in the core 30 and shift the lever 26 to the left so as to move the valve to closed position. At the same time the slidable cut-off switch mechanism will be moved so as to bring insulation 42 between spring contacts 43 and 44 and break the operating circuit of solenoid 32. Simultaneously the contact member 37 will be moved between the spring contacts 39 and 40. When the temperature in space heated by radiator C has fallen a predetermined amount, the thermostats F will respond to cause a circuit to be completed so that current will flow from mechanism G through wire 49, spring contact 40, movable contact 37, spring contact 39, wire 50, solenoid coil 33, wire 51, and neutral wire 48 back to the mechanism 15. The solenoid 33 will now be energized so as to draw in the core 31 and shift the valve back to the open position shown in Fig. 2, and at the completion of this movement the circuit will be broken by the movement of insulation 38 between the contacts 39 and 40, all as shown in the drawing. It will be understood that an exactly similar control mechanism is provided for moving the valve 5' in response to temperature changes in the larger compartment B heated by the radiating coils D. It will be apparent that the two control valves 5 and 5' are operated entirely independently of one another, and that when a sufficiently high temperature has been attained in compartment A the valve 5 will be closed but steam or vapor will continue to flow to and through the valve 5' and radiator D in the compartment B. Conversely, when a sufficiently high temperature has been reached in compartment B, the valve 5' may be closed without interfering with the flow of steam or vapor to the radiator C in compartment A.

When this system is first put in service after a period of disuse, it will be apparent that both valves 5 and 5' will be open and that the steam must flow first through the radiating coils C and thence through radiating coils D and force out the air from the entire system. At this time an abnormally high pressure will be built up in the system, and this pressure will sometimes be sufficient to cause the movable valve members 20 to stick and offer sufficient resistance to the electrical operating mechanism to cause the fuse to be burned out or the equivalent safety switch to be opened, thus rendering the automatic control mechanism inoperative until these elements are replaced or reset. This situation is particularly apt to arise in case of the valve 5 and its operating mechanism. The relatively small radiator C will first be filled with steam, and the compartment heated thereby may be raised in temperature sufficiently to cause the thermostatic mechanism to attempt to close valve 5 before the air has been completely forced out of the larger radiator D in compartment B. At this time the pressure in the system will still remain so high that the valve 5 may refuse to operate properly in response to the electric control mechanism.

The particular object of the present invention is to provide a means for temporarily rendering the thermostatically controlled electrically operated valve moving mechanism ineffective until the pressure in the system has been reduced to such a point that the movable valve member will be certain to operate properly without danger of burning out the fuses or opening safety switches. To accomplish this result, a pressure-operated circuit breaker is interposed in the circuit of the electrical valve operating mechanism, this circuit breaker being normally closed but being automatically opened whenever an abnormal pressure exists in the piping system. The pressure-operated motor for operating the circuit breaker is preferably connected with the pipe 12 connecting the valves 5 and 5', but it may be connected with any pipe of the system which leads from and back to the vapor regulator 1, since all parts of this piping circuit will be at substantially the same pressure. The circuit breaking switch is preferably positioned in the neutral wire 48 of the valve operating circuit, although it might be positioned in any of the wires which would open the operating circuit which tends to close the valve. The pressure responsive member is indicated as a whole at E, the fluid pressure motor being indicated at 52 and the circuit breaker at 53.

The motor 52 comprises a housing inclosing a pressure chamber 54 connected through pipe 55 and fitting 56 in open communication with the pipe 12, or some other suitable pipe of the steam circuit. A flexible diaphragm 57 forms the upper wall of chamber 54, this diaphragm being clamped against a shoulder 58 in the housing by means of a closure member 59 having a flange 60 which screws into the open upper end of the housing against the marginal flange portion of the diaphragm. A plunger 61 mounted in a chamber 62 formed in closure member 59 has a head 63 which is held in contact with the outer surface of diaphragm 57 by means of compression spring 64 which is confined between the head 53 and an inwardly extending annular flange 65 at the upper end of the closure member. The upper end of plunger 61 extends through and is guided in an opening 66 inclosed by flange 65, and the head 63 is guided in a central opening in a lower web 67 formed in the closure member 59. The circuit-breaking switch 53 is mounted on the closure 59. An insulated supporting member 68 mounted on closure 59 carries a fixed contact 69 to which one portion of wire 48 is connected. A spring contact member 70 is anchored at one end 71 on the insulated support 68, the contact 72 at its free end normally being held in engagement with fixed contact 69. The other section of wire 48 is connected with the fixed end 71 of the spring contact 70. The upper end of plunger 61 is adapted to engage the spring contact 70 and flex this spring contact upwardly so as to break the connection between contacts 69 and 72, this upward movement being limited by a stop screw 73 mounted in yoke 74. When normal pressures exist in the piping system of which pipe 12 forms a part, the diaphragm 57 will move down to the dotted line position shown in Fig. 3 and spring 64 will depress the plunger 61 so that spring contact 70 will hold the contacts 69 and 72 in their normal engagement so as to complete the circuit through wire 48. Whenever a predetermined abnormal pressure exists in the piping system, the diaphragm 57 will be forced upwardly as indicated in Fig. 3 so as to lift the plunger 61 against the resistance of spring 64 and elevate the spring contact 70 thus separating contacts 69 and 72 and breaking the circuit of which wire 48 forms a part.

Returning now to the operation of the typical installation shown in Fig. 1, we will first assume that the system is cold and that steam is admitted to the radiating system through vapor regulator 1. Steam will flow into supply pipe 4 and valve 5 to the first radiating loops C, thence back through valve 5 and pipe 12 to the second valve 5' and the larger radiator D. As already pointed out, an abnormally high pressure will be built up in the system until all of the air has been forced out of the radiating circuit. This high pressure will continue until the vapor has completely filled the larger radiating unit D and found its way back to the vapor regulator 1 so as to cut off the further flow of steam into the radiating system. Before this takes place, the smaller radiator C, now filled with vapor, will heat up the compartment A so that thermostats F may attempt to automatically close the valve 5. However, the pressure operated circuit breaker E will hold the switch 53 open as long as the abnormal pressure exists in the system so that the electrically operated system responsive to thermostats F will be unable to function and the valve 5 will temporarily remain open. As soon as the pressure in the system is reduced below the predetermined maximum, switch 53 will automatically close and the electrically operated system will immediately function to move valve 5 to closed position. From this point on, the switch 53 will remain closed (unless for some reason an abnormal pressure develops in the system) and the two thermostatically controlled switch-moving mechanisms will independently operate in the normal manner to control the temperatures in the two compartments A and B of the car.

While one particular installation has been shown by way of example in which this improved pressure-operated circuit breaker may be used advantageously, it will be understood that the improvement is not limited to use in a duplex system of this type, but may be used in numerous other radiator hook-ups involving either one or a plurality of automatically operated control valves. Furthermore, there are numerous forms and modifications of the electrical control mechanism for operating the valve already known in this art, and it is to be understood that the pressure-operated circuit breaker herein disclosed could be used in any system, other than the one here shown by way of example, since the only essential is that the operating circuit be temporarily broken while the abnormal steam pressure exists in the radiating circuit.

We claim:

1. In a vapor car heating system, in combination with a vapor regulator, means for supplying steam to the regulator, a radiating circuit comprising a supply valve, a supply conduit leading from the vapor regulator to the valve, a radiator loop leading from and back to the valve, and a return conduit connection through which fluids flow from the valve to the regulator, and thermostatically controlled means for moving the valve from a position in which vapor flows into and through the radiator loop to a position in which the vapor flow is shunted back to the regulator without passing through the loop, pressure controlled means for rendering this electrically operating means ineffective as long as a predetermined maximum pressure is exceeded in the radiating circuit.

2. In a vapor car heating system, in combination with a vapor regulator, means for supplying steam to the regulator, a radiating circuit comprising a supply valve, a supply conduit leading from the vapor regulator to the valve, a radiator loop leading from and back to the valve, and a return conduit connection through which fluids flow from the valve to the regulator, and thermostatically controlled means for moving the valve from a position in which vapor flows into and through the radiator loop to a position in which the vapor flow is shunted back to the regulator without passing through the loop, said means including a control circuit, a normally closed circuit-breaker in this circuit, and pressure-operated means for opening the circuit breaker as long as a predetermined maximum pressure is exceeded in the radiating circuit.

3. In a vapor car heating system, in combination with a vapor regulator, means for supplying steam to the regulator, a radiating circuit comprising a supply valve, a supply conduit leading from the vapor regulator to the valve, a radiator loop leading from and back to the valve, and a return conduit connection through which fluids flow from the valve to the regulator, and thermostatically controlled means for moving the valve from a position in which vapor flows into and through the radiator loop to a position in which the vapor flow is shunted back to the regulator without passing through the loop, said means including a control circuit, a normally closed circuit-breaker in this circuit, and a pressure-operated motor connected in open communication with one of the conduits of the radiating circuit for opening the circuit breaker whenever a predetermined maximum pressure is exceeded in the radiating circuit.

4. In a vapor car heating system, a relatively small radiator and a relatively large radiator, a control valve adapted to direct vapor first through the small radiator and then through the large radiator in series, thermostatically controlled electrically operating means for moving this valve to direct the vapor flow only through the large radiator when a certain temperature is reached in the space heated by the small radiator, and pressure controlled means for rendering this electrically operating means ineffective as long as a predetermined maximum pressure is exceeded in the radiating system.

5. In a vapor car heating system, a relatively small radiator and a relatively large radiator, a control valve adapted to direct vapor first through the small radiator and then through the large radiator in series, thermostatically controlled electrically operating means for moving this valve to direct the vapor flow only through the large radiator when a certain temperature is reached in the space heated by the small radiator, a normally closed circuit-breaker in the circuit of the electrically operating means, and a pressure-operated motor for opening the circuit-breaker whenever a predetermined maximum pressure is exceeded in the radiating system.

6. In a vapor car heating system, in combination with a vapor regulator, means for supplying steam thereto, a steam circuit extending from and back to the regulator comprising a pair of similar distributing valves arranged in series with one another, a radiating loop extending from and back to the first distributing valve, a radiating loop extending from and back to the second distributing valve, thermostatically controlled electrically operating means for each valve for independently moving that valve to such a position that the supply of vapor to the radiator loop connected therewith will be cut off when a certain temperature is reached in the space heated from that loop, but the continued flow of vapor to the other valve and loop will not be interfered with, and pressure-operated means for rendering the electrically operating means for the first valve ineffective as long as a predetermined maximum pressure is exceeded in the steam circuit supplied from the vapor regulator.

7. In a vapor car heating system, in combination with a vapor regulator, means for supplying steam thereto, a steam circuit extending from and back to the regulator comprising a pair of similar distributing valves arranged in series with one another, a radiating loop extending from and back to the first distributing valve, a radiating loop extending from and back to the second distributing valve, thermostatically controlled electrically operating means for each valve for independently moving that valve to such a position that the supply of vapor to the radiator loop connected therewith will be cut off when a certain temperature is reached in the space heated from that loop, but the continued flow of vapor to the other valve and loop will not be interfered with, a circuit breaker positioned in the circuit of the electrical operating means for the first valve, and pressure-controlled means for opening this circuit breaker whenever a predetermined maximum pressure is exceeded in the steam circuit supplied from the vapor regulator.

8. In a vapor car heating system, a radiating system comprising a pair of radiators, a control valve adapted to direct vapor first through one radiator and then through the other in series, thermostatically controlled electrically operating means for moving this valve to direct the vapor only through the second radiator when a certain temperature is reached in the space heated by the first radiator, and pressure controlled means for rendering this electrically operating means ineffective as long as a predetermined maximum pressure is exceeded in the radiating system.

EDWARD A. RUSSELL.
PAUL B. PARKS.